United States Patent [19]

Bourrières

[11] 3,957,238
[45] May 18, 1976

[54] CONVERTIBLE SYSTEM FOR PROVIDING A CONNECTION BETWEEN A SUPPORTING POLE AND ELECTRIC CABLES

[75] Inventor: Pierre Bourrières, Cahors, France

[73] Assignee: Manufacture d'Appareillage Electrique de Cahore, Cahors, France

[22] Filed: Dec. 9, 1974

[21] Appl. No.: 530,555

[30] Foreign Application Priority Data
Dec. 11, 1973  France .............................. 73.44138

[52] U.S. Cl. ............................ 248/68 R; 174/45 R; 174/149 R; 174/175; 248/70; 248/73
[51] Int. Cl.² ......................................... F16L 3/00
[58] Field of Search ............. 248/63, 59, 68 R, 67.5, 248/67.7, 70, 73, 221, 224, 231, 65, 226 E; 174/45 R, 149 R, 175; 24/115 J, 129 R, 130

[56] References Cited
UNITED STATES PATENTS

| 522,302 | 7/1894 | Nashold | 248/68 R |
|---|---|---|---|
| 598,441 | 2/1898 | Sargent | 24/129 R |
| 622,778 | 4/1899 | Nordyke | 248/68 R X |
| 780,420 | 1/1905 | Gross | 248/70 |
| 821,401 | 5/1906 | Carter | 174/175 X |
| 887,520 | 5/1908 | Rehling | 24/129 R |
| 1,804,962 | 5/1931 | Thorpe | 248/68 R X |
| 2,216,886 | 10/1940 | Langelier | 248/226 E |
| 2,386,129 | 10/1945 | Maack | 24/129 R X |
| 2,454,677 | 11/1948 | Smalley | 248/67.7 X |
| 2,558,058 | 6/1951 | Nelson | 248/289 X |
| 3,486,725 | 12/1969 | Hidassy | 248/68 R |
| 3,572,639 | 3/1971 | Shettel | 174/175 UX |
| 3,734,438 | 5/1973 | Kautz | 248/221 |
| R14,312 | 6/1917 | Ragotzky | 248/65 |

*Primary Examiner*—James T. McCall
*Assistant Examiner*—Rodney H. Bonck
*Attorney, Agent, or Firm*—Young & Thompson

[57] ABSTRACT

The connection system comprises a support consisting of a flanged sole-plate which is secured to a pole by means of straps and carries a longitudinal guide rib on which are slidably fitted separate and detachable retaining members in stacked relation respectively for threading and terminating electric cables.

6 Claims, 12 Drawing Figures

CONVERTIBLE SYSTEM FOR PROVIDING A CONNECTION BETWEEN A SUPPORTING POLE AND ELECTRIC CABLES

This invention relates to a convertible system for providing a connection between a supporting pole and electric cables for the purpose of either terminating or threading said cables irrespective of the number of these latter. This invention is also intended to ensure easy adaptation of the connection system to service requirements which may make it necessary to modify the number and/or the distribution of the electric cables.

In the present invention, "electric cables" are understood to mean low-tension cables and especially telephone cables.

A number of different systems for providing a connection between a supporting pole and electric cables are already known.

A first group of connection systems makes it possible to thread cables but not to anchor these latter.

In these systems, the cable rests on the insulating support to which it is secured by any tying means, the support being attached to the pole by means of various components and especially by means of a nail in the case of a wood pole.

A second group of connection systems makes it possible to anchor a cable but not to thread this latter through the support.

A certain number of these systems entail the use of a metallic contact between the cable and its support and include the system known by the name of "metallic wedge" or "snail".

Other systems of the same group prevent the metallic contact mentioned above and make use of an insulating material such as rubber or plastics. This is the method employed in the construction of anchoring wedges in which a member of triangular section or a trapezoidal slide-block is so arranged as to clamp the cable after this latter has been inserted into a sleeve through which a passageway extends in a longitudinal direction and which is rigidly fixed to an anchoring hook. This mode of assembly, however, is possible only with certain dimensions of cables which correspond to the cross-sectional area of the passageway.

A third group of connection systems permits both threading and anchoring of cables.

This connection can be carried out by means of a metal hook suspended from a bracket pierced by a single hole. Apart from the disadvantage of the metallic contact, this system entails the need for a number of supports equal to the number of cables. These disadvantages are partly overcome by using a perforated L-section member, one flange of which is secured to the pole whilst the other flange can be fitted with a series of metal hooks, each hook being intended to provide a connection with a cable.

These two systems both have the disadvantage of a metallic contact between the cable and the support.

Moreover, the fixed supports attached to the pole are usually made of galvanized steel, are therefore of substantial weight, are costly to produce and also have a fairly short preservation period by reason of metal corrosion.

A third system which is employed both for threading and anchoring cables is intended to remove the disadvantage of the metallic contact. This system is constituted by a rubber or plastic stirrup-piece known as a saddle within which the cable is engaged, said stirrup-piece being attached to the support by means of a metal suspension hook. However, this system does not eliminate the disadvantage of requiring a metal support which is attached to the pole and designed to receive a plurality of hooks, the number of which is necessarily equal to the number of cables.

The aim of the present invention is to overcome the disadvantages and limitations involved in the use of existing connection systems. This invention is intended to carry out both threading and anchoring of electric cables with equal ease irrespective of the number of cables, to prevent any metallic contact between the cable and its support, to provide a universal connection system which can be adapted to any type of pole or post of wood or metal, and finally to provide users with detachable and convertible connection devices, the number of which is determined in each case as a function of practical requirements.

In accordance with the invention, the convertible system for providing a connection between a supporting pole and electric cables for terminating or threading said cables essentially comprises a support fixed along the pole and intended to receive a plurality of detachable and separate cable-retaining members, said members being slidably mounted on the support and disposed successively along this latter.

The arrangement of the support along the pole in a vertical direction makes it possible to mount on this latter in stacked relation a series of retaining members, the number and type of which correspond to requirements.

In a preferred embodiment of the invention, the support comprises a sole-plate applied against the pole and a projecting longitudinal rib which serves as a guide for retaining members, interchangeable end-fittings of said retaining members being given profiles which are complementary to the rib profile and being similar to each other in height. The threading members are so arranged as to possess a possibility of lateral angular displacement and the terminating members are each provided with a projecting portion in which is cut a slot for receiving the end portion of a cable in the anchoring position.

Further properties and advantages of the invention will be brought out by the following description, reference being made to the accompanying drawings which are given by way of example without any limitation being implied, and in which.

Figure 1:
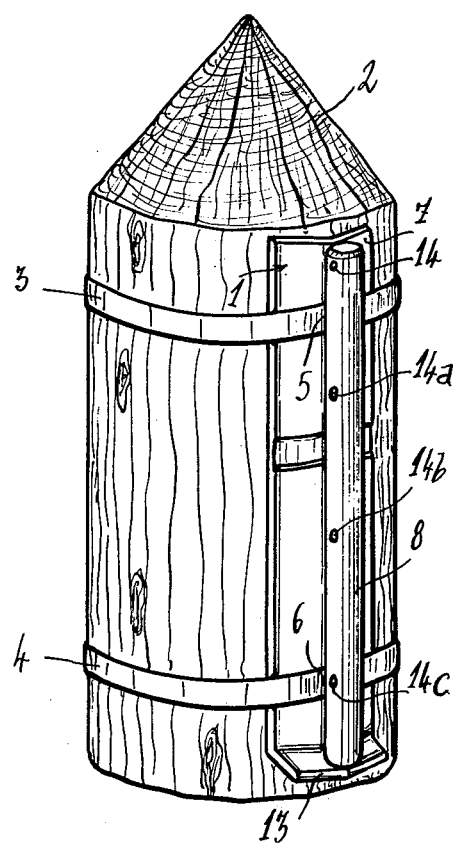
FIG. 1 is a perspective diagram of a support fixed on a pole which is shown in front elevation, no retaining member having been fitted on said support.
Figure 2:
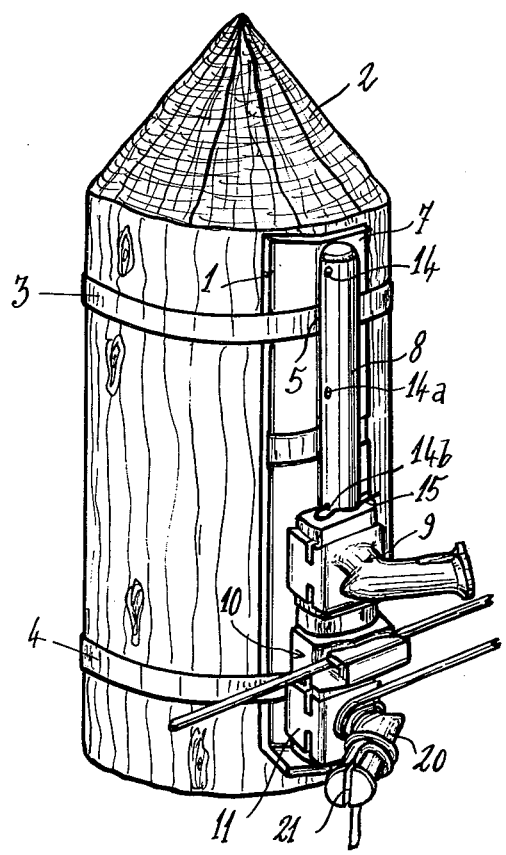
FIG. 2 is a view which is similar to FIG. 1 and showing the same support fitted with cable-retaining members.

Referring to FIGS. 1 and 2, 5 and 6, it is seen that a convertible connection system in accordance with the invention comprises a support 1 disposed vertically along a pole 2 to which it can be attached by any suitable means, especially by means of at least two straps 3 and 4 engaged through slits 5 and 6 which are formed for this purpose in the support 1.

Said support 1 which is preferably formed of plastic material comprises a sole-plate 7 applied against the pole 2 and a longitudinal rib 8 which forms a projection with respect to the sole-plate on the side remote from the pole.

The rib 8 serves as a guide for retaining members 9 and 10 which are also formed of plastic material and comprise a foot or end-fitting 11, 12 respectively, the profile of which is complementary to that of the rib 8. The end-fittings 11, 12 thus constitute slide-blocks which can be slidably fitted over the rib 8.

The lower end of the support has a heel or supporting flange 13 which projects substantially to the level of the front face of the rib 8 on the side remote from the pole 2.

Transverse holes 14, 14a, 14b, 14c ... are drilled in spaced relation along the rib 8 with a pitch corresponding to the height of the end-fittings 11, 12. Said drilled holes are intended to receive a pin 15 in order to lock the upper retaining member 9 or 10 in position.

Figure 3:
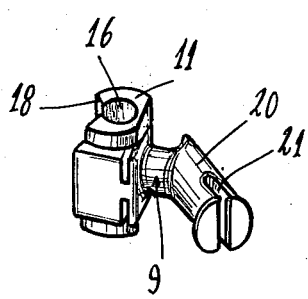
FIG. 3 is a perspective diagram to a larger scale showing a retaining member which serves to anchor a cable.
Figure 4:
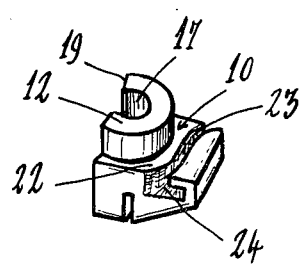
FIG. 4 is a perspective diagram to a larger scale showing a retaining member which serves to thread a cable.
Figure 5:
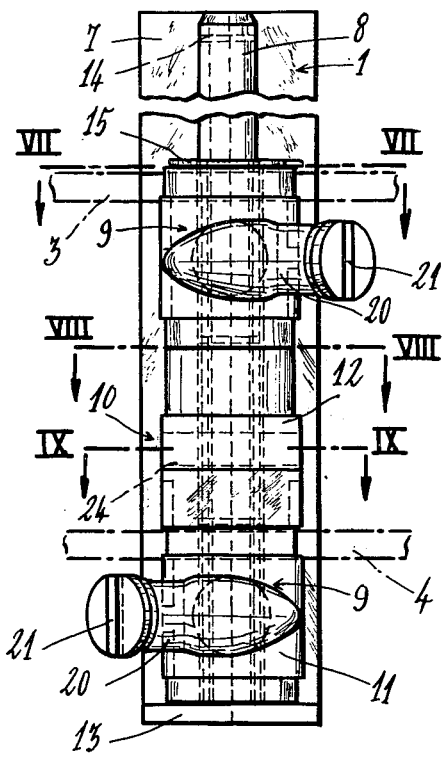
FIG. 5 is a view in front elevation showing the support fitted with two anchoring members and one cable-threading member.
Figure 6:
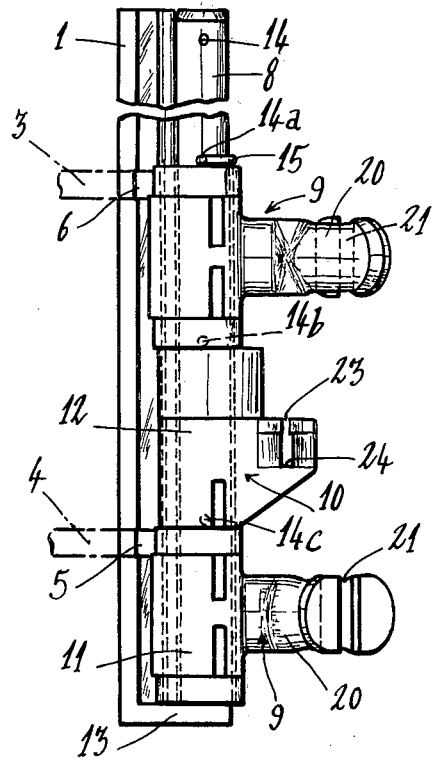
FIG. 6 is a view in side elevation showing the support fitted in accordance with FIG. 5.

Referring now to FIGS. 3 and 4, it is apparent that the retaining members 9 and 10 have the same internal module delimited by a female surface 16 and 17, the profile of which conforms exactly to that of the rib 8, thus permitting the displacement of said members in sliding motion along said rib. Moreover, all the retaining members also have the same module in the longitudinal direction, along the edges 18 and 19 of their end-fittings, thus making them interchangeable.

However, the retaining members 9 which serve to anchor cables have distinguishing structural features with respect to the retaining members 10 through which cables are intended to be threaded.

Figure 7:
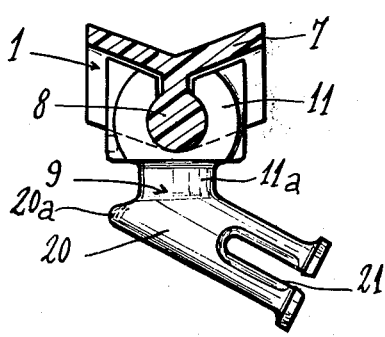
FIG. 7 is a view of an anchoring member after a cross-section has been made through the support along the line VII—VII of FIG. 5.

It is apparent from FIG. 7 that the anchoring member 9 is mounted without any possibility of transverse pivotal motion about the rib 8 since the end-fitting 11 of this latter does not have any degree of freedom with respect to the rib 8 and to the sole-plate 7. On the other hand, the member 9 is reversible by turning it the other way round.

Said member 9 is provided on the side remote from the rib 8 with a projecting portion 11a having an extension in the form of an anchoring dog 20 which is directed laterally with respect to the end-fitting 11 of said member. The dog 20 which forms a heel 20a with the projecting portion 11a has a slot 21 formed in the extremity of the anchoring dog 20 for the purpose of receiving the end portion of a cable in the anchoring position. After the member 9 has been mounted, the structure of said member is such that the dog 20 retains a constant orientation with respect to the sole-plate 7 of the support 1 but is capable of taking up two symmetrical positions by being turned the other way round in a plane at right angles to the longitudinal direction of the rib 8.

Figure 8:
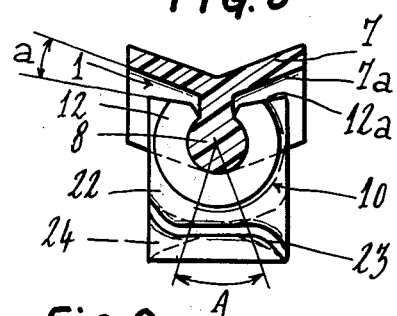
FIG. 8 is a view of a threading member after a cross-section has been made through the support along the line VIII—VIII of FIG. 5.

There is shown in FIG. 8 a retaining member 10 through which the cable is intended to be threaded. Said member 10 is mounted with a possibility of lateral angular displacement in a transverse direction with respect to the sole-plate 7 of the support 1. The angle A through which the member 10 is capable of pivoting about the rib 8 is clearly equal to twice the angle $a$ made between these latter respectively by the face 7a of the sole-plate 7 and the face 12a of the end-fitting 12 of the retaining member 10 when said member is in the symmetrical position shown in FIGS. 8 and 9.

On the side remote from the rib 8, said member 10 is provided with a tubular boss 22 which forms a lateral projection with respect to the end-fitting 12 of said member and the internal passageway 24 of which is oriented at right angles to said end-fitting.

The passageway 24 extends on each side of the tubular boss 22 and has external openings in the form of flared orifices 25, the opposite lateral faces 26 of which are inclined to each other at an angle which is preferably between 30° and 45°.

The passageway 24 is provided at the top portion thereof with an S-shaped slot 23 which is intended to permit the insertion of the cable at any point of its length without cutting said cable.

The advantages of the system in accordance with the invention will become more clearly apparent from the following description of its operation.

In order to put this system into service, the sole-plate 7 of the support 1 is applied vertically along any pole or post 2 of wood, metal or concrete. The support is rigidly fixed to the pole by means of two or more straps 3, 4, the free ends of which are engaged through the slits 5 and 6 formed in the support 1. Each free end is drawn back to the rear of the pole 2 on the side remote from the support 1 in such a manner as to bring it into contact with the fastening buckle which is attached to the other end of the strap. The free end of said strap is then engaged in the buckle in known manner, the strap is tightened around the pole and its free end is passed back into the ring of the buckle, thus fastening it in position.

One or a number of retaining members 9 or 10 are then put into service by causing them to slide along the rib 8 and choosing the member or members which meet the requirements of anchoring or threading of cables.

The sliding motion is continued until the retaining member comes into contact with the heel 13 or with the member 9–10 which has previously been placed in position. In one possible design, a locking-pin 15 is inserted above the top retaining member in order to lock this latter in position.

Since the anchoring member 9 is reversible, said member can take up two symmetrical positions by being turned the other way round. The end-fitting 11 will accordingly be placed on the rib 8 at the time of assembly in such a manner as to ensure that the anchoring dog 20 of said member is oriented towards the end of the electric cable to be anchored.

In a preferential embodiment, the anchoring dog 20 makes an angle of 60° with the axis of symmetry of the end-fitting 11.

Figure 10:
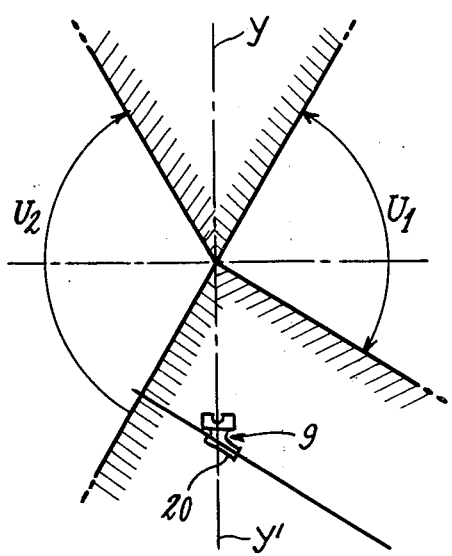
FIGS. 10 to 12 are explanatory diagrams indicating the useful angles of the retaining members.

It is apparent from FIG. 10 that the last section of the cable which extends to the pole 2 can be placed within a useful horizontal angle $U_1$ which is approximately 90° in the zone which is located on the same side as the dog 20 of the anchoring member 9 with respect to the direction $Y'-Y$ at right angles to the support 1. On the other hand, the useful angle $U_2$ is approximately 120° in the zone located on the side opposite to the preceding with respect to the direction $Y'-Y$ at right angles to the support 1. The shaded zones in the figure are forbidden zones.

Figure 11:
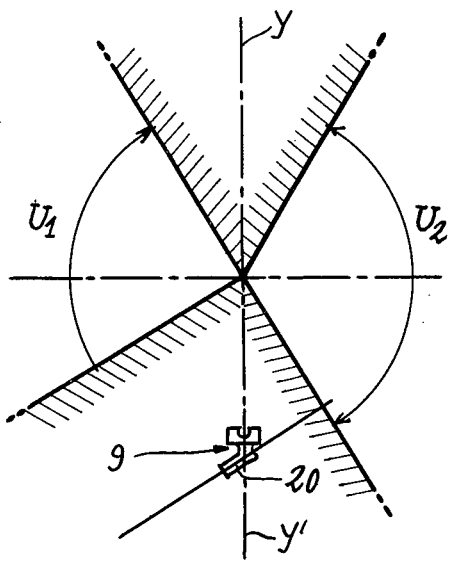

FIG. 11 shows an arrangement which is symmetrical with that of FIG. 10 after the anchoring member 9 has been turned the other way round. In order to terminate a cable, one or two idle turns are passed round the projecting portion 11a whilst the heel serves to retain these latter; one or two turns are then passed round the anchoring dog 20 and the fastening is completed by inserting the free end of the cable within the slot 21 of the dog 20.

Should it be desired to pass a cable through in a so-called threading operation, a retaining member 10 is displaced in sliding motion along the rib 8 by engaging the end-fitting 12 of said member over the rib 8 so as to ensure that the slot 23 is located at the top. The portion of electric cable which is located in front of the pole 2 is inserted through said slot 23 in the direction of the internal passageway 24. Since the bottom portion of the internal passageway 24 normally serves as a support for that portion of the cable which passes through the retaining member 10, it is preferable to forestall any danger of subsequent dropping of the cable by mounting said member 10 in the position described in the foregoing, that is to say with the slot 23 located at the top.

It is also apparent that the arrangement of the flared orifices 25 prevents the cable from being subjected to shear stresses. The effect of the orifices 25 is added to the possibility of lateral displacement through the angle A as contemplated earlier. This facilitates the mounting of the cables in the threading position and makes it possible to absorb more readily the stresses arising from wave propagation which are liable to occur in the cable.

Figure 9:
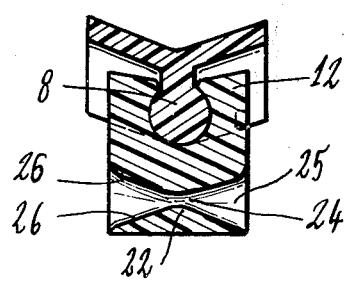
FIG. 9 shows the same threading member after a cross-section has been made along the line IX—IX of FIG. 5.
Figure 12:
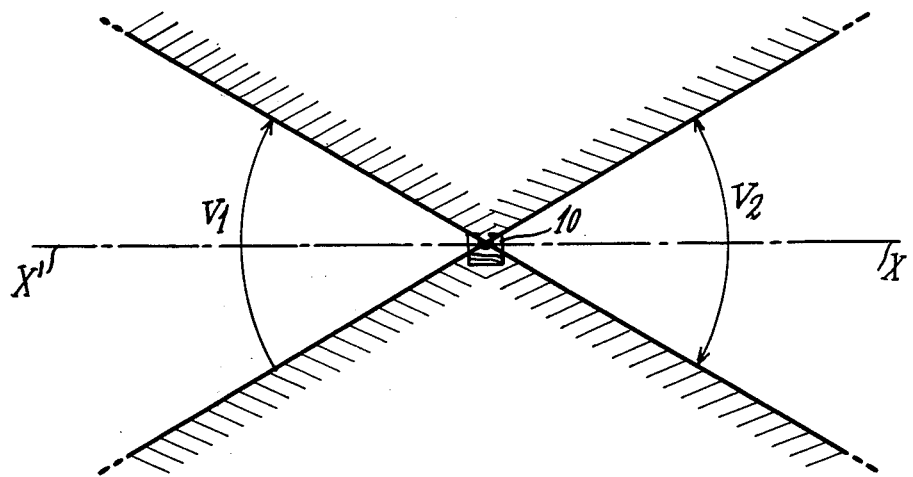

It can be seen in FIG. 12 that the useful angles $V_1$, $V_2$ for the use of the threading member 10, in a preferred embodiment of the invention, are approximately equal to 60° on the upstream side and on the downstream side respectively, these angles being each disposed symmetrically about a front axis $X'-X$ at right angles to the longitudinal direction of the rib 8, the member 10 being in the symmetrical position shown in FIGS. 8 and 9. The shaded zones in FIG. 12 are forbidden zones.

Many alternative forms of application of the invention may be contemplated.

In a preferential embodiment, the support and the retaining members are fabricated from molded plastic material on an industrial scale, thereby endowing them not only with the advantage of low capital cost but also with the double advantage of natural electrical insulation and high resistance to corrosion and ageing.

It is further apparent that the connection system in accordance with the invention is readily adapted to the requirements of service conditions. The system makes it possible to limit the number of retaining members fitted in position solely to the number of electric cables which are to be anchored or threaded at any particular moment. As a consequence, it avoids untimely installation and needless immobilization of retaining members which are not yet required for service; the system provides a means of rapidly meeting an intensification of this service by adding fresh retaining members to a support which has already been mounted or even, after saturation of a first support, makes it possible to add a plurality of supports which are identical with the first and to fix these latter on the pole as requirements dictate. Irrespective of the number of cables, interchangeability of the retaining members is thus always ensured, with the result that stocks can be reduced and put to rational use at the lowest cost.

It is readily apparent that other alternative forms of construction can be devised in addition to those mentioned in the foregoing description without thereby departing either from the scope or the spirit of the present invention.

We claim:

1. A convertible system for providing a connection between a supporting pole and electric cables for the purpose of either terminating or threading said cables, comprising a support fixed along the pole for a variable number of detachable and separate cable-retaining members, said members being slidably mounted on the support and disposed successively on said support, wherein the support comprises a bearing sole-plate attached to the pole and carrying a shaped longitudinal rib which projects outwards from the pole and is substantially vertical in the service position, the lower end of said rib being disposed opposite to a projecting flange of said sole-plate, the retaining members being each provided with an end-fitting having a profile which is complementary to the profile of the rib, said end-fitting being capable of free engagement over said rib at the upper end thereof and of sliding down to a position of abutting contact with said flange of said sole-plate, or with the end-fitting of the preceding member, said retaining members comprising, threading members provided with threading means for inserting a cable therethrough and said threading members being mounted on the support with a possibility of lateral angular displacement in a transverse direction with respect to said sole-plate.

2. A system according to claim 1, in which said rib comprises a circular profiled outer portion symmetrically attached lengthwise to the sole-plate by a substantially continuous intermediate web, said threading members having an open keyhole profile complementary to the profile of the outer cylindrical portion of the profiled rib and having prongs having ends spaced from said sole-plate on opposite sides of said rib thereby to permit said lateral angular displacement.

3. In a convertible system for attaching electric cables to a support such as a pole, for the purpose of either terminating or threading said cables, said system comprising an elongated bearing sole-plate provided with attachment means to be affixed to the suport and carrying a profiled longitudinal rib which projects outward from the sole-plate and is substantially vertical in the service position, the lower end of said rib being adjacent to a terminal projecting flange of the sole-plate, said rib being adapted to receive a plurality of separate and detachable cable-retaining members each slidably engaged over the upper end of the rib by an end fitting having a female profile which is complementary to the profile of the rib, and each capable of being arrested in abutting engagement either by said projecting flange or by the end fitting of a lower member; the improvement wherein said profiled rib of the sole-plate rib comprises a circular profiled outer portion symmetrically attached lengthwise to the sole-plate by a substantially continuous intermediate web, a plurality of threading members and anchoring members for electric cables and comprising each a modular interchangeable endpiece having an open keyhole profile complementary to the profile of the outer cylindrical portion of the profiled rib and sliding over said profiled rib, at least some endpieces of said modular interchangeable members having prongs having at their ends a clearance with the sole-plate on opposite sides of the rib for limited pivotal movement of the last-named endpieces around said outer portion of the profiled rib.

4. A convertible system according to claim 3, wherein the sole plate comprises a substantially dihedral profile with an obtuse angle open toward the pole, and an apex attached to the intermediate rib, attachment means of sole-plate comprising slits provided in the intermediate web over said apex of the sole-plate, for attachment straps to be arranged in a tight manner around the pole.

5. A convertible system according to claim 3, wherein said profiled rib is integrally molded with the sole-plate in plastic material, said interchangeable modular members being also molded in plastic material.

6. A system according to claim 3, wherein the end fittings of the attachment members each have a modular height which is a fraction of the total height of the rib, the latter being provided with locking holes spaced at regular intervals each equal to said modular height, for a locking pin to be mounted over the end fitting of the uppermost attachment member.

* * * * *

UNITED STATES PATENT AND TRADEMARK OFFICE
CERTIFICATE OF CORRECTION

PATENT NO. : 3,957,238
DATED : May 18, 1976
INVENTOR(S) : Pierre BOURRIERES

It is certified that error appears in the above-identified patent and that said Letters Patent are hereby corrected as shown below:

Item [73] in the name of the assignee, change "Cahore" to --Cahors--.

Signed and Sealed this

Ninth Day of November 1976

[SEAL]

Attest:

RUTH C. MASON
Attesting Officer

C. MARSHALL DANN
Commissioner of Patents and Trademarks